(12) United States Patent
Elden

(10) Patent No.: US 9,233,700 B1
(45) Date of Patent: Jan. 12, 2016

(54) PORTABLE CART WITH REMOVABLE SHOPPING BAG

(71) Applicant: Richard Elden, Carson, CA (US)

(72) Inventor: Richard Elden, Carson, CA (US)

( * ) Notice: Subject to any disclaimer, the term of this patent is extended or adjusted under 35 U.S.C. 154(b) by 0 days.

(21) Appl. No.: 14/523,911

(22) Filed: Oct. 26, 2014

(51) Int. Cl.
*B62B 1/04* (2006.01)
*B62B 1/12* (2006.01)
*B62B 1/00* (2006.01)
*B62B 1/26* (2006.01)

(52) U.S. Cl.
CPC . *B62B 1/12* (2013.01); *B62B 1/008* (2013.01); *B62B 1/266* (2013.01)

(58) Field of Classification Search
CPC ............ B62B 1/12; B62B 1/008; B62B 1/00; B62B 1/02; B62B 1/04; B62B 1/042; B62B 1/10
USPC ....................................... 280/47.27
See application file for complete search history.

(56) References Cited

U.S. PATENT DOCUMENTS

| 1,554,034 | A | 9/1925 | Richie | |
|---|---|---|---|---|
| 2,514,849 | A | 7/1950 | Dewing | |
| 2,757,935 | A | 8/1956 | Sofia | |
| 3,041,026 | A | 6/1962 | Wilson | |
| 3,276,786 | A | 10/1966 | Olander | |
| 3,804,432 | A * | 4/1974 | Lehrman | 280/654 |
| 4,202,521 | A | 5/1980 | Harding | |
| 4,887,837 | A * | 12/1989 | Bonewicz et al. | 280/654 |
| D352,145 | S | 11/1994 | Server Perez | |
| 5,660,476 | A | 8/1997 | DeCoster | |
| 5,678,842 | A | 10/1997 | Hook | |
| 6,126,183 | A | 10/2000 | Lensing | |
| 6,601,859 | B2 * | 8/2003 | Durham | 280/47.131 |
| 6,626,634 | B2 * | 9/2003 | Hwang et al. | 414/801 |
| 7,140,635 | B2 * | 11/2006 | Johnson et al. | 280/646 |
| 7,914,015 | B2 | 3/2011 | Tompkins | |
| 8,317,219 | B2 | 11/2012 | Bruce | |
| 8,366,124 | B1 | 2/2013 | Caldwell | |
| 8,439,374 | B1 | 5/2013 | Elden | |
| 2002/0089134 | A1 | 7/2002 | Salzberger | |
| 2012/0055122 | A1 * | 3/2012 | Beauchamp | 53/492 |

* cited by examiner

*Primary Examiner* — John Walters
*Assistant Examiner* — Brian Swenson
(74) *Attorney, Agent, or Firm* — Thomas I. Rozsa

(57) ABSTRACT

A portable heavy wheeled flat based foldable transport cart which includes a transport cart with a shopping bag with multiple pockets therein which is removably affixed to the cart. While weighing only four (4) pounds, the honeycombed toe plate and large heavy wheels enable the cart to carry one hundred sixty (160) pounds of load when the shopping bag is removed.

19 Claims, 12 Drawing Sheets

PORTABLE CART WITH REMOVABLE SHOPPING BAG

BACKGROUND OF THE INVENTION

1. Field of the Invention

The present invention relates to the field of transport carts which are used by individuals to transport groceries and other heavy objects such heavy combined cases of charcoal, soft drinks and coolers which when subsequently used are used to retain objects such as sodas and beer which are kept cool by ice.

2. Description of the Prior Art

The following fourteen (14) patents and published patent applications are the closest prior art known to the inventor.

1. U.S. Pat. No. 1,554,034 issued to David R. Richie on Sep. 15, 1925 for "Parcel Carrier" (hereafter the "Richie Patent");

2. U.S. Pat. No. 2,514,849 issued to Francis W. Dewing on Jul. 11, 1950 for "Shopping Bag Carrier Cart" (hereafter the "Dewing Patent");

3 U.S. Pat. No. 2,757,935 issued to Antonio Sofia on Aug. 7, 1956 for "Collapsible Shopping Cart" (hereafter the "Sofia Patent");

4. U.S. Pat. No. 3,041,026 issued to Earl F. Wilson on Jun. 26, 1962 for "Sack Cart" (hereafter the "Wilson Patent");

5. U.S. Pat. No. 3,276,786 issued to Ward Olander on Oct. 4, 1966 for "Nestable Shopping Cart" (hereafter the "Olander Patent");

6. U.S. Pat. No. 4,202,521 issued to Frank M. Harding on May 13, 1980 for "Combination Bag Holder and Dolly" (hereafter the "Harding Patent");

7. United States Design Patent No. Des. 352,145 issued to Juan Server Perez on Nov. 1, 1994 for "Shopping Cart" (hereafter the "Perez Design Patent");

8. U.S. Pat. No. 5,660,476 issued to Pieter K. J. DeCoster on Aug. 26, 1997 for "Shopping Bag" (hereafter the "DeCoster Patent");

9. U.S. Pat. No. 5,678,842 issued to Reginald Wayne Hook et al. on Oct. 21, 1997 for "Collapsible Cart" (hereafter the "Hook Patent");

10. U.S. Pat. No. 6,126,183 issued to Robert E. Lensing on Oct. 3, 2000 for "Foldable Cart With Automatic Bag Control" (hereafter the "Lensing Patent");

11. United States Published Patent Application No. 2002/0089134 to Marc Salzberger et al. on Jul. 11, 2002 for "Shopping Bag Cart" (hereafter the "Salzberger Published Patent Application");

12. U.S. Pat. No. 7,914,015 issued to Mary Tompkins on Mar. 29, 2011 for "Wheeled Shopping Tote" (hereafter the "Tompkins Patent");

13. U.S. Pat. No. 8,317,219 issued to Robert S. Bruce on Nov. 27, 2012 for "Wheeled Cart for Transporting Outdoor Equipment" (hereafter the "Bruce Patent");

14. U.S. Pat. No. 8,366,124 issued to Richard Caldwell on Feb. 5, 2013 for "Convertible Beach Cart" (hereafter the "Caldwell Patent").

The Richie Patent discloses a parcel carrier. As illustrated in the figures, the wheels are very thin and cannot support a heavy load. The patent also discloses a base member 15 which is described on Column 2 Lines 40 through 45 as a flat rectangular metal plate having its lateral edges 16 turned up at right angles to its general plane to enable the support to be folded substantially parallel to the side members. The containing item, B, is a bag. The bag is a flexible bag.

The Dewing Patent discloses a shopping bag carrier cart. In the pictures, there is disclosed a metal frame which can be folded over on its side from the figures as illustrated, The Sophia Patent discloses a collapsible shopping cart. It has a metal frame which is folded over on itself as illustrated in FIG. 4. A wire frame bag is also part of the cart.

The Wilson Patent discloses a sack cart which again has large wheels 16 although looking at them in FIG. 2, the wheels are very thin. There is also a sack which is removably retained to the cart member and is retained by a hanger which is essentially a frame which extends forwardly from the metal shaft of the handle and to which the bag is retained.

The Olander Patent discloses a nestable shopping cart. The concept here is that one cart can be inserted and nested with another almost comparable to the carts seem in an airport, is clearly of a different configuration.

The Harding Patent discloses a combination bag holder and dolly but the bag itself is retained in a different manner from the present invention and the bag is like a laundry bag as opposed to the shopping bag.

The Server Perez Design Patent protects the shape of the object and the way it looks. It issued in 1994 and has expired. It discloses a shopping cart with a triangular shaped retaining member for retaining objects.

The cart has an elongated frame having upper and lower sections which are pivotally coupled together. The frame is adjustable between a deployed position where the upper and lower frame sections are substantially aligned longitudinally and a collapsed position where the upper and lower frame sections are folded together. A pair of wheels are pivotally coupled to the lower section of the frame which fold together when the frame is collapsed. A support arm for suspending a load is pivotally coupled to the frame upper section and is moveable between a horizontal, load-supporting position and a folded position extending alongside the frame. The shopping bags are suspended from a plurality of hooks mounted on the support arm."

It holds a multiplicity of shopping bags but they are each individually tied and do not have pockets and there is no base in which to support the weight of the bags so if the bags are weighted too heavily, they can break unless they are made out of very strong material.

The DeCoster Patent discloses a shopping bag. Specifically, the patent discloses:

"A carrier pack including a shopping bag with a separate cooler bag strap-connected to and stacked with the shopping bag or, alternatively, received within the interior chamber of the shopping bag."

The Hook patent discloses a collapsible cart for transporting a plurality of hand held shopping bags.

The Lensing Patent discloses a foldable cart with automatic bag control. The patent discloses a portable, wheeled cart foldable between stowage and deployed positions automatically captivates and suspends trash bags. A generally U-shaped and inverted main frame extends from a top forming a handle to the lower cart wheels. A companion subframe of generally U-shaped profile is pivoted to the frame. Preferably a foldable platform is provided at the cart base for supporting the trash bag.

The Salzberger Published Patent Application discloses a shopping bag cart. Specifically, the patent application disclose a one time use shopping cart for quick assembly by sales clerks when a customer is unable to hand carry a purchase. Designed for the carrying-slings of today's bags the cart suspends a loaded grocery bag spread eagle from extensions projecting out from the shoulders of the cart's cross arms. A bag can be slung from the front and the back of each cross arm. The larger types of plastic and paper bags with carrying handles in common use can also be accommodated.

The Tompkins Patent discloses a wheeled shopping cart and it discloses a shopping tote including a vertical support structure having one or more hooks for suspending bags therefrom enables carrying of shopping bags and/or boxes in an easy and convenient manner. A platform may be provided for placing of boxed items. The tote may be quickly changed between a compact storage condition and an in-use condition. When in the storage condition, the tote is of a size allowing carrying thereof alone or in a backpack, briefcase or purse.

The Bruce Patent discloses a wheeled cart for transporting outdoor equipment. The patent discloses a rolling cart for transporting items commonly used at outdoor gatherings in a secure and convenient manner. The cart comprises a frame having two or more tires 20, an open-ended bag connected to the frame, and a strap that holds one or more items of equipment against the frame. The strap is positioned near the open end of the bag and is used to cinch equipment that extends outside the bag against the frame.

The Caldwell Patent discloses a convertible beach cart. Specifically, the patent discloses: A preferred embodiment includes a convertible hand truck with three main components: a hand truck body with dual use as a table, a load platform with dual use as an extended surface of the table, and a rack with dual use as support legs for the table.

The present inventor is also the inventor of the Lightweight High Load Capacity Folding Utility Cart With Unique Support Structure And. Ergonomic Handle protected by issued U.S. Pat. No. 8,439,374 issued on May 4, 2013.

SUMMARY OF THE INVENTION

The present invention is an improvement over the present inventor's prior patented invention which includes a portable heavy wheeled foldable transport cart with a shopping bag with multiple pockets therein which is removably affixed to the cart. While weighing only four (4) pounds, the honeycombed toe plate and large heavy wheels enable the cart to carry one hundred sixty (160) pounds of load when the shopping bag is removed. A unique attachment clip affixed to a crossbar enables the folded cart to be locked onto the honeycomb toe plate to assure a firm lock when the cart is folded for storage. The cart folds in half for compact storage.

The present invention includes the following objects:
(1) To provide a portable heavy wheeled foldable transport cart with a shopping bag with a deep central chamber to retain groceries and other objects, and also including multiple side pockets to retain other objects;
(2) The shopping bag is removable affixed to the cart;
(3) The cart weighs only four (4) pounds, and includes a honeycombed toe plate supported and the cart's base and large heavy wheels to enable the cart to carry up to one hundred sixty (160) pounds of load when the shopping bag is removed;
(4) The cart is folded to half its width for storage and includes a unique attachment clip affixed to a crossbar enables the folded cart to be locked onto the honeycomb toe plate to assure a film lock when the cart is folded for storage. The cart folds in half for compact storage;
(5) The large four (4) inch wheels with rubber tires enables the cart to be rolled over uneven surfaces such as sand, curbs, stairs. cobblestones and other uneven surfaces as well as ordinary level surfaces;
(6) To make it easier for someone to pull the cart when a heavy load is transported using the cart. One innovation to facilitate this object is to have the toe plate elevated above the ground and not resting on the ground as is found in most prior art carts having a toe plate. The second innovation to facilitate this object is to have 50% of the diameter of each wheel (or approximately 50% of the diameter of each wheel) in line with the toe plate instead of the entire diameter of each wheel behind the toe plate as is found in most prior art carts. The combination of the raised toe plate and a substantial portion of the wheels in line with the toe plate makes it easier to pull the cart having a heavy load.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Key innovative elements of the present invention are best described referring to FIGS. 1 through 6, 7a, 7b and 8 with the bag removed so that the structural elements of the cart are more clearly visible.

Figure 1:
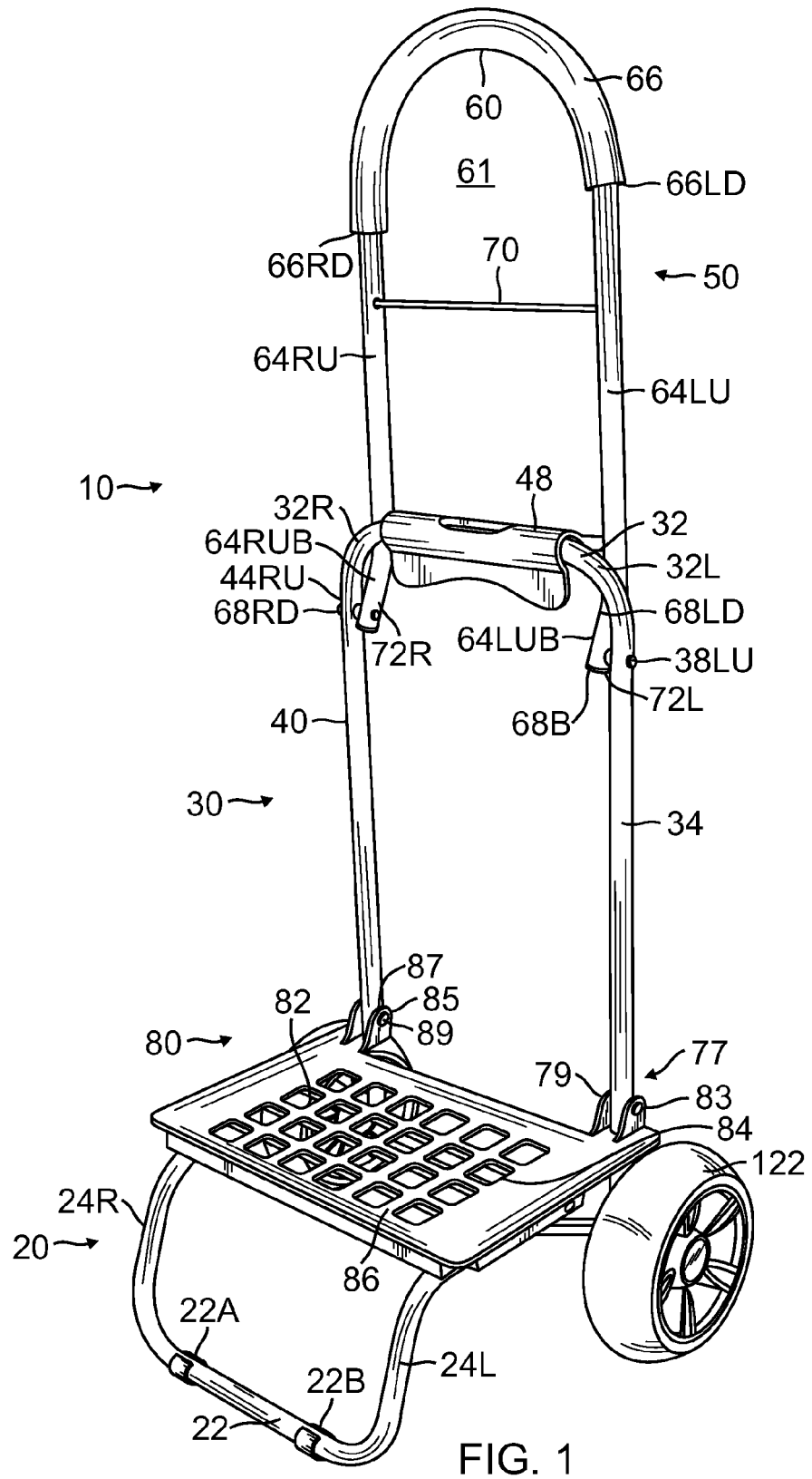
FIG. 1 is a top right side front perspective view of the present invention cart, illustrating the cart in the standing fully erect condition with the upper handle section above the lower handle section, the honeycomb toe plate and one of the large rubber bumper wheels (beefy wheels) which are four (4) inches in diameter to enable the cart to be rolled over sand, stairs, curbs, cobblestones and any uneven surface, also including an upper crossbar between the top vertical sections with the bag removed.

FIG. 1 is a top right side front perspective view of the present invention cart 10, illustrating the cart 10 in the standing fully erect condition with the upper handle section 50 above the lower handle section 30 with the honeycomb toe plate 80 and one of the large rubber bumper wheels (beefy wheels) 122 which are four (4) inches in diameter to enable the cart 10 to be rolled over sand, stairs, curbs, cobblestones and any uneven surface, also including an upper crossbar 90 between the top vertical sections with the bag removed.

Figure 2:
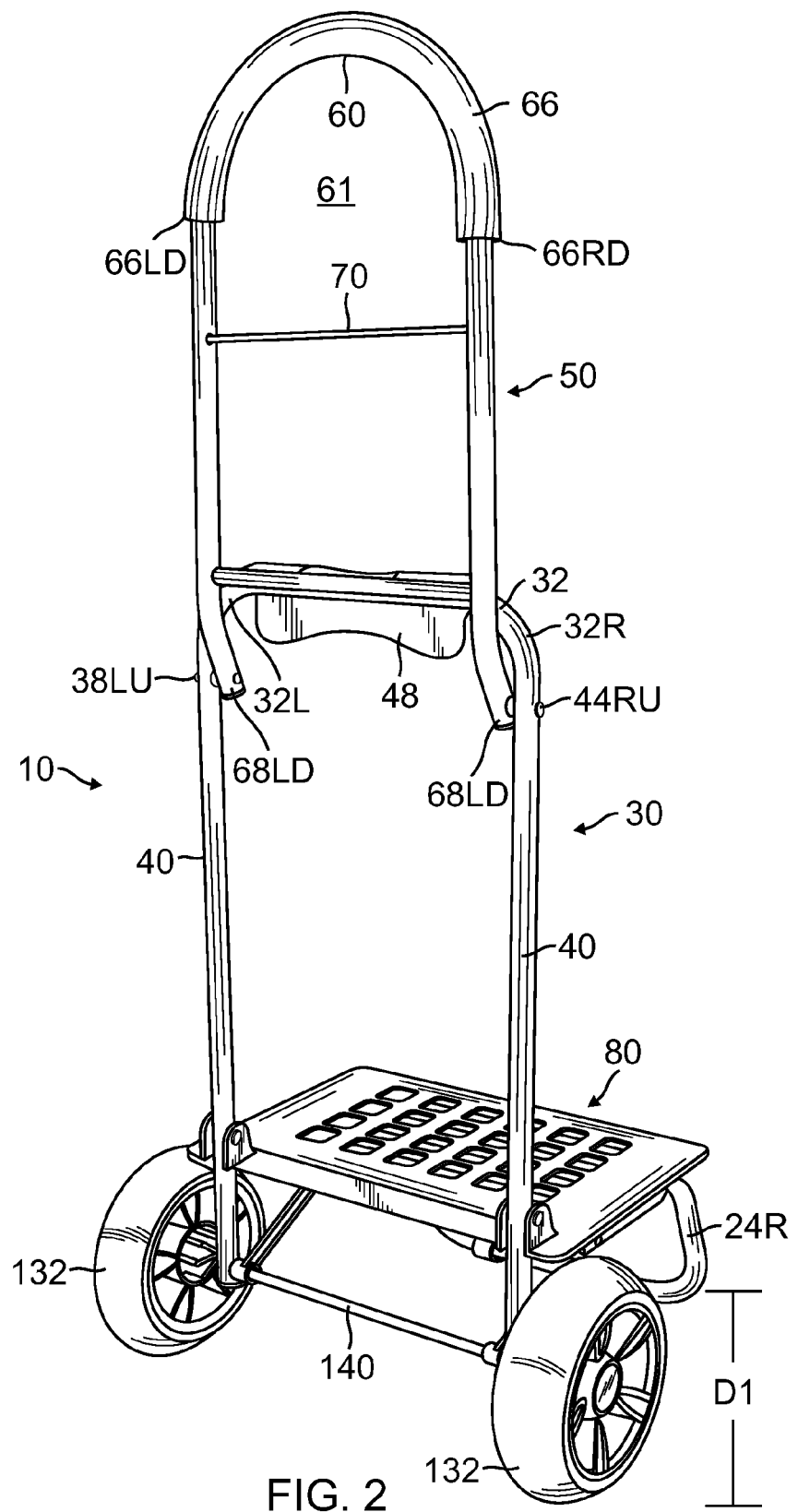
FIG. 2 is a top left side rear perspective view of the present invention cart, illustrating the cart in the standing fully erect condition with the upper handle section above the lower handle section, the honeycomb toe plate and both of the large rubber bumper wheels (beefy wheels) which are four (4) inches in diameter to enable the cart to be rolled over sand, stairs, curbs, stones and other uneven surfaces, also including an upper crossbar between the top vertical sections with the bag removed.
Figure 3:
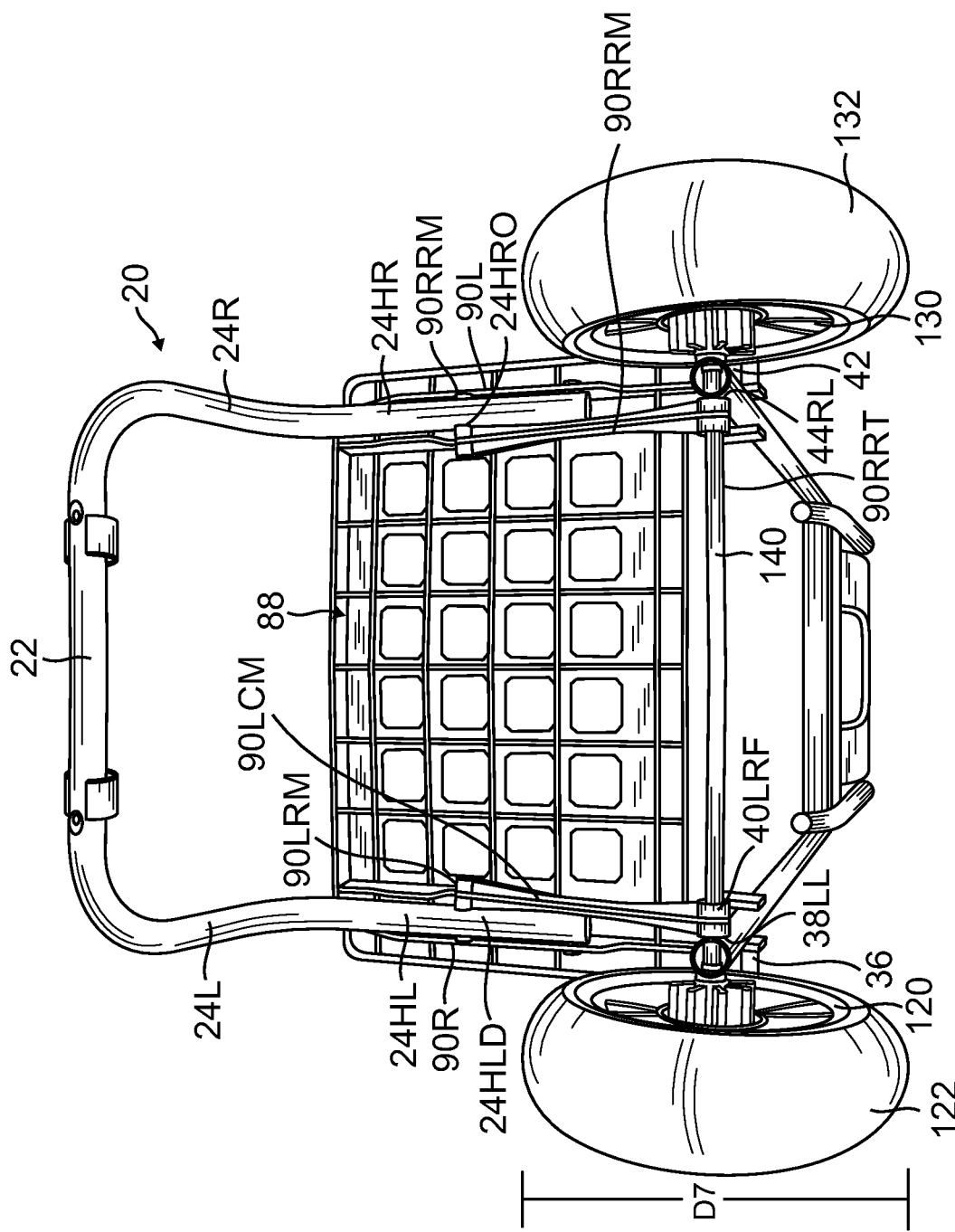
FIG. 3 is a bottom perspective view of the base bar, the toe plate, and the bottom interconnecting bar which rotatably interconnects the pair of large wheels, the lower left vertical member and the lower right vertical member of the lower cart frame, and the toe plate, also illustrating the affixation of the toe plate to the left and right horizontal members of the base bar.

FIG. 2 is a top left side rear perspective view of the present invention cart 10, illustrating the cart 10 in the fully erect standing condition with the upper handle section 50 above the lower handle section 30 with honeycomb toe plate 80 and both of the large rubber bumper wheels (beefy wheels) 122 and 132 which are four (4) inches in diameter to enable the cart 10 to be rolled over sand, stairs, curbs, stones and other uneven surfaces, also including an upper crossbar 90 between the top vertical sections with the bag removed FIG. 3 is a bottom perspective view of the base bar, the toe plate, and the bottom interconnecting bar which rotatably interconnects the pair of large wheels, the lower left vertical member and the lower right vertical member of the lower handle section, and the toe plate, also illustrating the affixation of the toe plate to the left and right horizontal members of the base bar and to the interconnecting bar.

Figure 4:
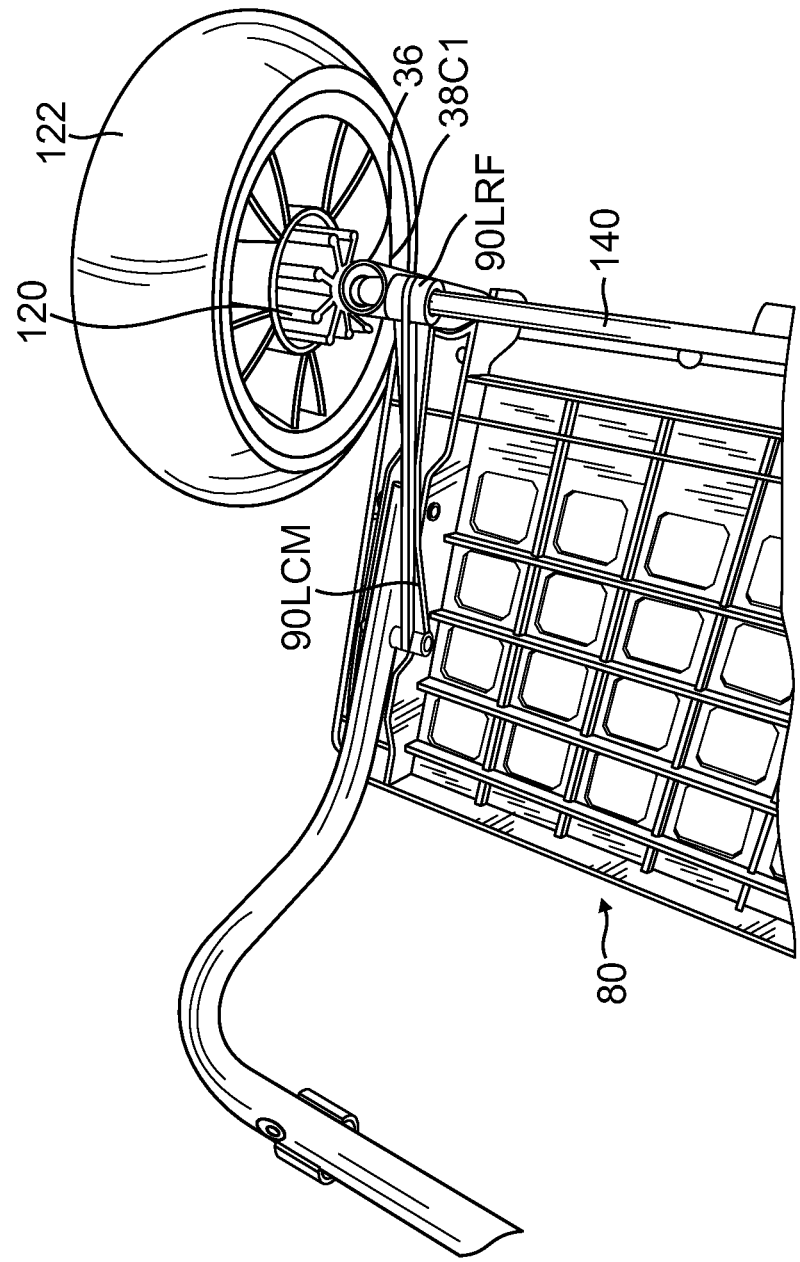
FIG. 4 is an enlarged bottom perspective view of portion of the base bar, the toe plate, and the bottom interconnecting bar illustrating in greater detail the rotatable interconnection of one of the pair of large wheels, a portion of the lower right vertical member of the lower cart frame, and the toe plate, also illustrating in greater detail the affixation of the toe plate to the left horizontal member of the base bar.

FIG. 4 is an enlarged bottom perspective view of portion of the base bar, the toe plate, and the bottom interconnecting bar illustrating in greater detail the rotatable interconnection of one of the pair of large wheels, a portion of the lower right vertical member of the lower cart frame, and the toe plate, also illustrating in greater detail the affixation of the toe plate to the left horizontal member of the base bar.

Figure 5:
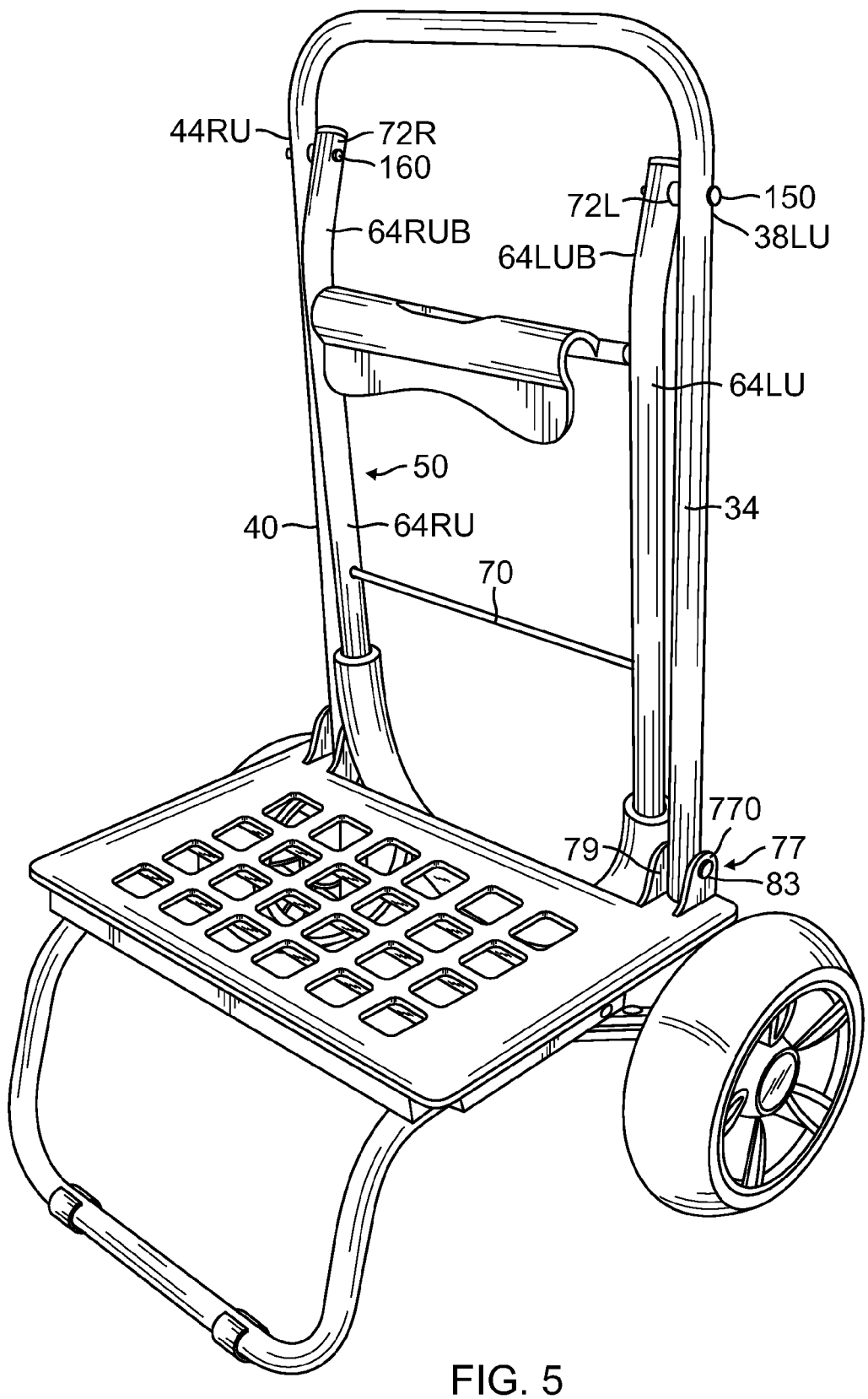
FIG. 5 is a top right side front perspective view of the present invention cart, illustrating the cart in the standing condition with the upper handle section folded against the lower handle section to begin the process of folding the cart for storage.
Figure 6:
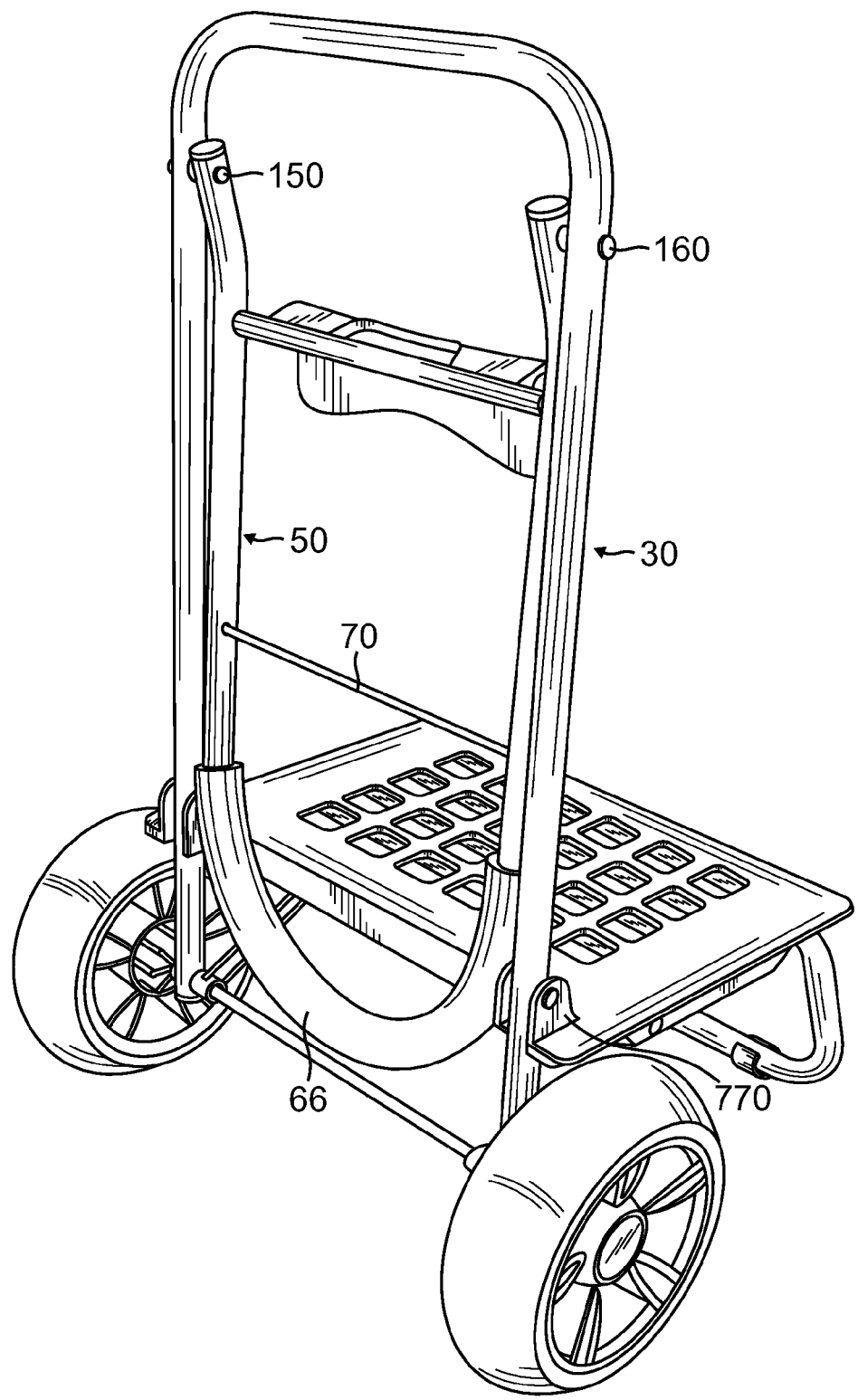
FIG. 6 is a rear left side rear perspective view of the present invention cart, illustrating the cart in the standing condition with the upper handle section folded against the lower handle section to begin the process of folding the cart for storage.

FIG. 5 is a top right side front perspective view of the present invention cart, illustrating the cart in the standing condition with the upper handle section folded against the lower handle section to begin the process of folding the cart storage FIG. 6 is a rear left side rear perspective view of the present invention cart, illustrating the cart in the standing condition with the upper handle section folded against the lower handle section to begin the process of folding the cart for storage.

Figure 7:
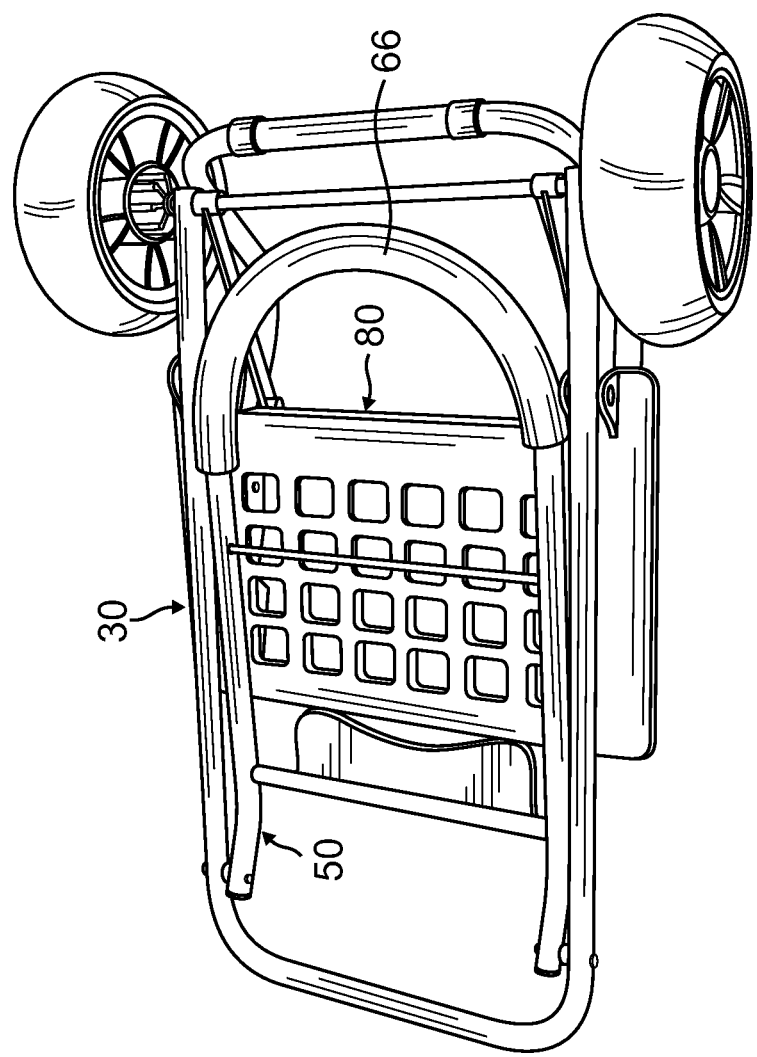
FIG. 7 is a top left side rear perspective view of the present invention cart, illustrating the cart in the fully folded condition with the honeycomb toe plate and both of the large rubber bumper wheels (beefy wheels) which are four (4) inches in diameter folded against the lower handle section in additional to the upper handle section folded against the lower handle section.

FIG. 7 is a top left side rear perspective view of the present invention cart, illustrating the cart in the fully folded condition with the honeycomb toe plate and both of the large rubber bumper wheels (beefy wheels) which are four (4) inches in diameter folded against the lower handle section in additional to the upper handle section folded against the lower handle section.

Figure 8B:
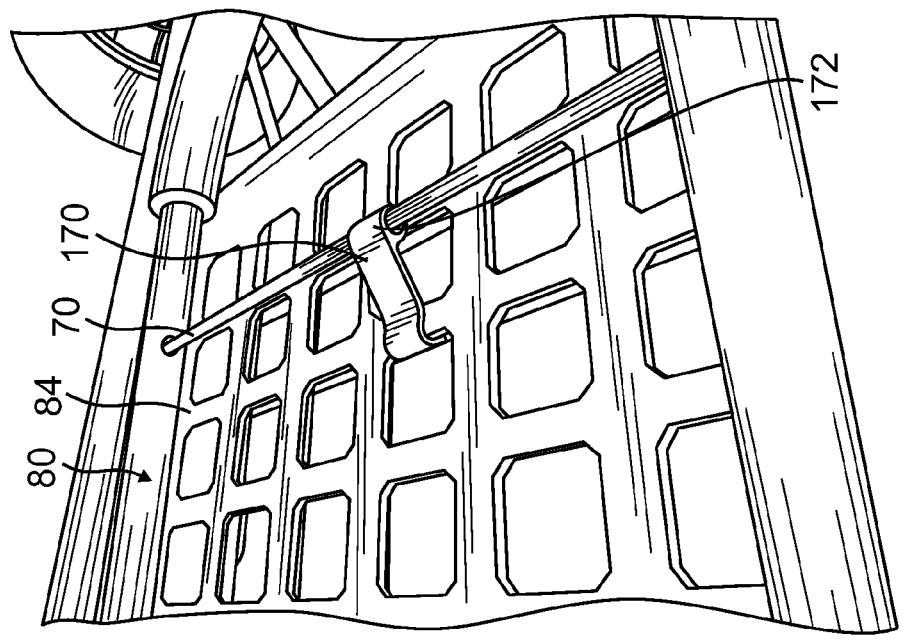
FIG. 8b is a top left side rear perspective view of a closeup of the toe plate and the crossbar with the bag removed from the present invention and illustrating the locking tab rotatably affixed at the rear end to the crossbar and the tab locked in one of the transverse members of the toe plate so that when the cart is in the folded condition, the locking tab serves to securely lock the cart in a folded condition for safe storage.
Figure 8A:
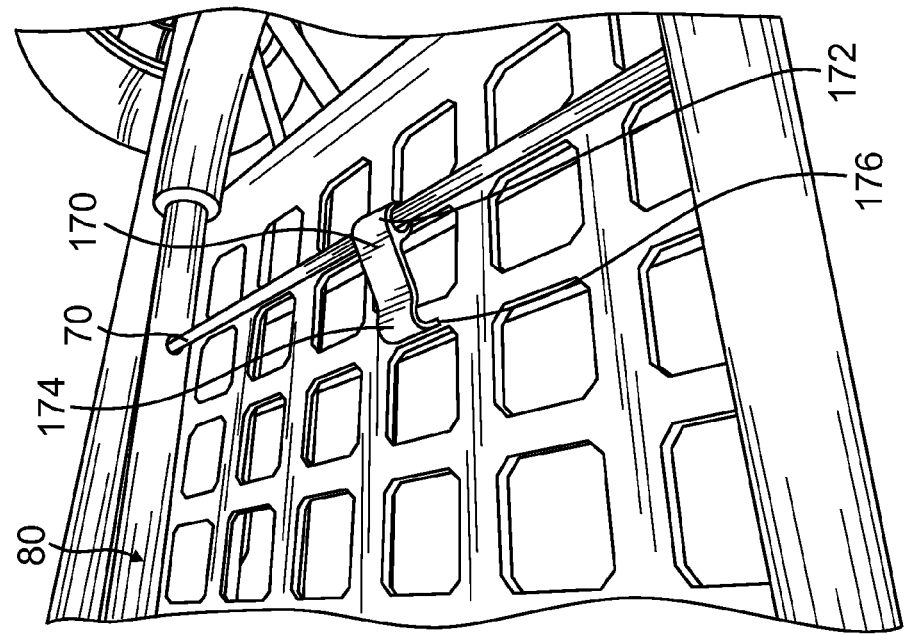
FIG. 8a is a top left side rear perspective view of a closeup of the upper crossbar between the upper handle vertical sections with the bag removed from the cart, and a locking member rotatably affixed to the crossbar at one end and a locking tab in the unlocked condition at its front end and resting against the honeycomb toe plate.

FIG. 8a is a top left side rear perspective view of a closeup of the upper crossbar between the upper handle vertical sections with the bag removed from the cart, and a locking member rotatably affixed to the crossbar at one end and a locking tab in the unlocked condition at its front end and resting against the honeycomb toe plate.

FIG. 8b is a top left side rear perspective view of a closeup of the toe plate and the crossbar with the bag removed from the present invention and illustrating the locking tab rotatably affixed at the rear end to the crossbar and the tab locked in one of the transverse members of the toe plate so that when the cart is in the folded condition, the locking tab serves to securely lock the cart in a folded condition for safe storage.

Figure 9:
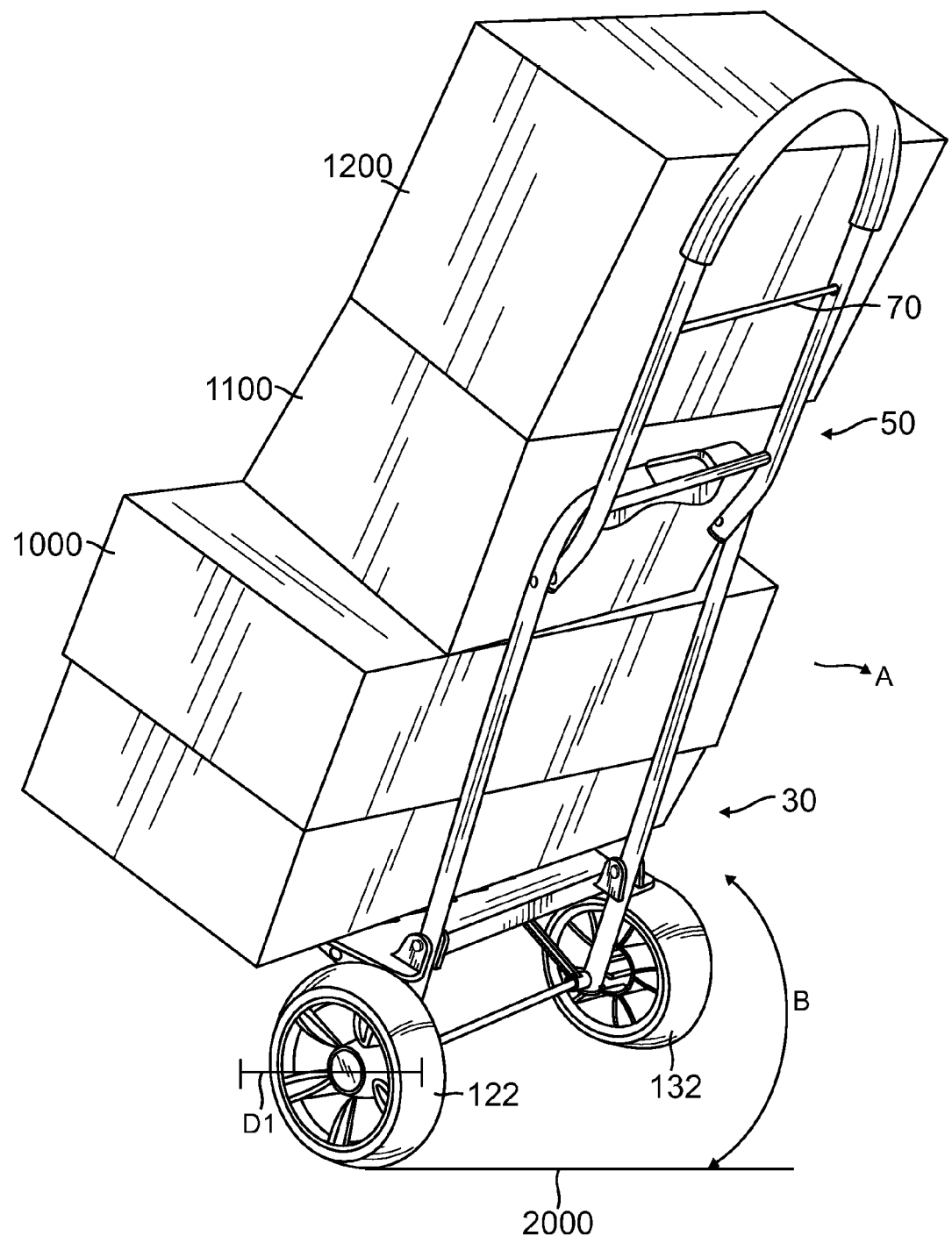
FIG. 9 is a top left side rear perspective view of the present invention cart, illustrating the cart in the fully erect standing condition with a heavy load of objects resting in a stacked condition on the honeycomb toe plate and both of the large rubber bumper wheels (beefy wheels) which are four (4) inches in diameter to enable the cart to be rolled over sand, stairs, curbs, stones and other uneven surfaces, also including an upper crossbar between the top vertical sections with the heavy load also supported by the upper crossbar.

FIG. 9 is a top left side rear perspective view of the present invention cart, illustrating the cart in the fully erect standing condition with a heavy load of objects resting in a stacked condition on the honeycomb toe plate and both of the large rubber bumper wheels (beefy wheels) which are four (4) inches in diameter to enable the cart to be rolled over sand, stairs, curbs, stones and other uneven surfaces, also including an upper crossbar between the top vertical sections with the heavy load also supported by the upper crossbar.

The present invention is illustrated in its fully erect standing condition in FIGS. 1 and 2. The left and right portions of the cart are described from a point of view standing behind the cart. Some of the components are more clearly illustrated in FIG. 3. The cart 10 includes base section 20 made of one piece including a bottom horizontal section 22 respectively extending on both its left side and right side, the left side extending to arcuate section 24L which in turn extends to elevated horizontal section 24HL and the right side extending to arcuate section 24R which in turn extends to elevated horizontal section 24HR. Bottom horizontal section 22 also includes a pair of stabilizing clips 22A and 22B wrapped around section 22.

Referring to FIGS. 1 and 2 which illustrate the cart 10 in the erect condition, the cart includes a first lower handle section 30 which is formed in one piece as an elongated U-shaped member having an upper generally horizontal section 32 which extends from its left side 32L to a lower vertical left leg member 34 and extends from its right side 32R to a lower vertical right leg member 40. Lower vertical left leg member 34 ends at a distal end 36 and has two transverse openings extending through it—a first left transverse opening 38LU adjacent horizontal section 32 and a second left transverse opening 38LL adjacent distal end 36. Lower vertical right leg member 40 ends at a distal end 42 and has two transverse openings extending through it—a first right transverse opening 44RU adjacent horizontal section 32 and a second night transverse opening 44RL adjacent distal end 42. A protective sheath 48 surrounds a majority of horizontal section 32. Protective sheath 48 also serves as a handle to enable a person to grasp the first lower handle section 30 and serves as a spacer to be described.

Further referring to FIGS. 1 and 2 which illustrate the cart 10 in the erect condition, the cart includes a second upper handle section 50 which is formed in one piece as an elongated U-shaped member having an upper generally U-shaped section 60 which is covered by a fabric or rubber grip covering member 66 having a left distal end 66LD and a right distal end 66RD. Upper U-shaped section 62 extends to an upper vertical left leg member 64LU and to an upper vertical right leg member 64RU. A crossbar 70 extends across the interior 61 of upper handle section 50 and is affixed to upper vertical left leg member 64LU and upper vertical right leg member 64RU, at a location adjacent distal ends 66LD and 66RD of covering member 66 and extends transversely to the respective direction of upper vertical left and right leg members 64LU and 64RU. The upper vertical left leg member 64LU has a distal end 68LD, the section 64LUB of upper vertical left leg member 64LU adjacent distal end 68LD is bent at an angle relative to upper vertical left leg member 64LU. A transverse opening 72L extends across upper vertical leg section 64LUB adjacent distal end 68LD. The upper vertical right leg member 64RU has a distal end 68RD, the section 64RUB of upper vertical right leg member 64RU adjacent distal end 68RD is bent at an angle relative to upper vertical right leg member 64RU. A transverse opening 72R extends across upper vertical leg section 64RUB adjacent distal end 68RD.

Referring to FIGS. 1, 2, 3 and 4, an important element of the present invention is the toe plate 80 which has a honeycomb pattern with a multiplicity of openings 82 separated by horizontal solid sections 84 and vertical solid sections 86.

Referring to FIGS. 3 and 4, one innovation to assist a user in pulling a heavy load with the cart 10 is that the toe plate 80 rests on and affixed to the elevated horizontal sections 24HL and 24RL of bottom horizontal section 22 so that the toe plate 80 is elevated above the ground. The underside 88 of toe plate 80 has a left horizontal channel 90L into which elevated left horizontal section 24HL is inserted and rotatably retained by left rotational affixation member 90LRM extending through opening 24HLO in elevated left horizontal section 24HL. The underside 88 of toe plate 80 also has a right horizontal channel 90R into which elevated right horizontal section 24RL is inserted and rotatable retained by right rotational affixation member 90RRM extending through opening 24HRO in elevated right horizontal section 24HR.

Referring to FIGS. 1, 2, 3 and 4, the present invention cart 10 has a pair of oppositely disposed large bumper wheels (beefy wheels) 110 and 120 with large rubber tires 122 and 132. Each of the wheels with tires has a diameter "D-1" of four (4) inches (or approximately 4 inches) A horizontal mounting bar 140 retains left rotational tube 90LRT which in turn is connected by a left connecting member 90LCM to left rotational affixation member 90LRM to further retained toe plate 80, extends through second transverse opening 38LL adjacent distal end 36 of lower vertical left leg member 34 and then extends into left bumper wheel (beefy wheel) 120. Similarly, horizontal mounting bar 140 retains right rotational tube 90RRT which in turn is connected by a right connecting member 90RCM to right rotational affixation member 90RRM to further retain toe plate 80, extends through second transverse opening 44RL adjacent distal end 42 of lower vertical right leg member 40 and then extends into right bumper wheel (beefy wheel) 130. A key innovation is that one-half (or approximately one-half) of the diameter "D-1" of each bumper wheels (beefy wheels) 122 and 132 is aligned with toe plate 80 to help facilitate a user pulling the cart when it has a heavy load. In addition, the benefit of the large bumper wheels (beefy wheels) 122 and 132 is they facilitate the cart carrying a heavy load and enable the cart 10 to be rolled over uneven surfaces such as sand, stairs, cobblestones, etc. in addition to level surfaces such as a parking lot or street.

Referring to FIGS. 5 and 6, the upper handle section 50 is rotatably connected to lower handle section 30 by a left rotatable affixation member or pin 150 extending through aligned transverse openings 38LU and 72L and by a right rotatable affixation member or pin 160 extending through aligned transverse openings 38RU and 72R. The rotation of upper handle section 50 relative to lower handle section 30 is in the counter-clockwise direction so that upper handle section 50 is within lower handle section 30 and gripping member 66 of upper handle section 50 rests against an interior wall 81 of toe plate section 80.

Referring to FIGS. 1, 5 and 7, toe plate 80 has a left collar 77 with a lower portion of lower vertical left leg member 34 having an aligned third transverse opening 79 with a rotatable affixation pin 83 rotatably extending through aligned openings 77O in left collar 77 and aligned transverse opening 79. Similarly, toe plate 80 has a right collar 85 with a lower portion of lower vertical right leg member 40 having an aligned third transverse opening 87 with a rotatable affixation pin 89 rotatably extending through aligned openings 85O in right collar 85 and aligned transverse opening 87. The cart 10 is illustrated in a fully folded condition in FIG. 7. FIG. 7 is a top left side rear perspective view of the present invention cart 10, illustrating the cart in the fully folded condition with the honeycomb toe plate 80 and both of the large rubber bumper wheels (beefy wheels) 122 and 132 which are four (4) inches in diameter folded against the lower handle section 30 in additional to the upper handle section 50 folded against the lower handle section 30.

FIG. 8a is a top left side rear perspective view of a closeup of the upper crossbar 70 between the upper handle vertical sections with the bag removed from the cart, and a locking member 170 rotatably affixed to the crossbar 70 at one end 172 and a locking tab 174 in the unlocked condition at its front end 176 and resting against the honeycomb toe plate 80. FIG.

8*b* is a top left side rear perspective view of a closeup of the toe plate 80 and the crossbar 70 with the bag removed from the present invention and illustrating the locking tab 170 rotatably affixed at the rear end 172 to the crossbar 70 and the tab 174 locked in one of the transverse members 84 of the toe plate 80 so that when the cart 10 is in the folded condition, the locking tab 170 serves to securely lock the cart 10 in a folded condition for safe storage.

FIG. 9 is a top left side rear perspective view of the present invention cart 10, illustrating the cart 10 in the fully erect standing condition with a heavy load of objects 1000, such as charcoal 1100 (a case of bottles of water) and 1200 (a cooler) resting in a stacked relationship on toe plate 80 and against lower handle section 30 and upper handle section 50. The cart 10 is rotated in a clockwise direction and rolled and pulled I the direction of arrow "A". The angle "B" of the cart 10 relative to surface 2000 ranges from 10 degrees to 60 degrees. As previously described, the cart 10 has two unique features which makes the cart 10 easier to pill: (1) the toe plate 80 is elevated above the ground 2000; and (2) one-half of the diameter "D-1" of the large bumper wheels (beefy wheels) 122 and 132 is aligned with the toe plate 80.

Figure 10:
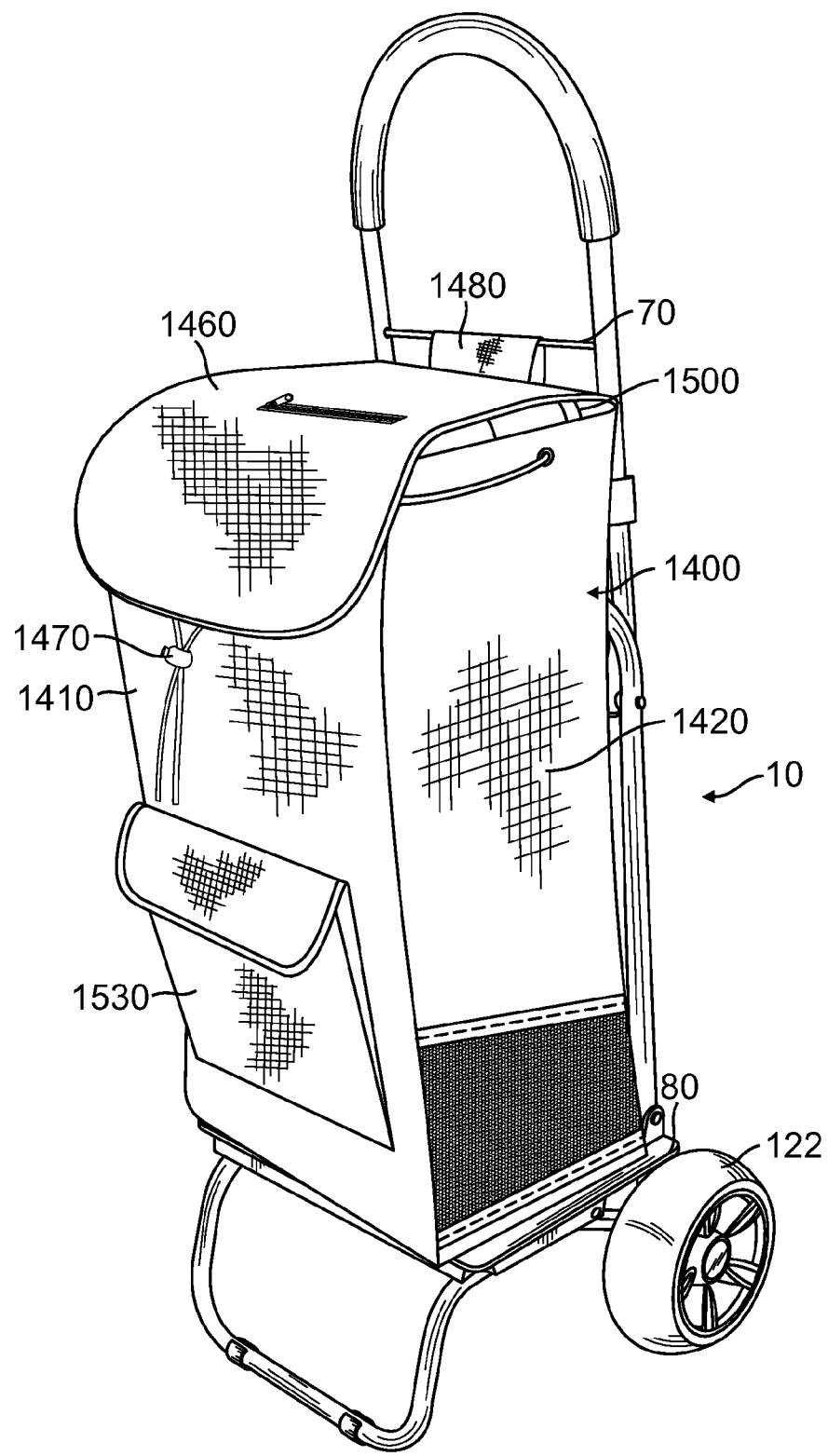
FIG. 10 is a top right side front perspective view of the present invention cart, illustrating the cart in the standing fully erect condition with the honeycomb toe plate and one of the large rubber bumper wheels (beefy wheels) which are four (4) inches in diameter to enable the cart to be rolled over sand, stairs, curbs, cobblestones and any uneven surface, also including an upper crossbar between the top vertical sections of the upper handle section with the bag retained by the upper crossbar and resting on the toe plate.
Figure 11:
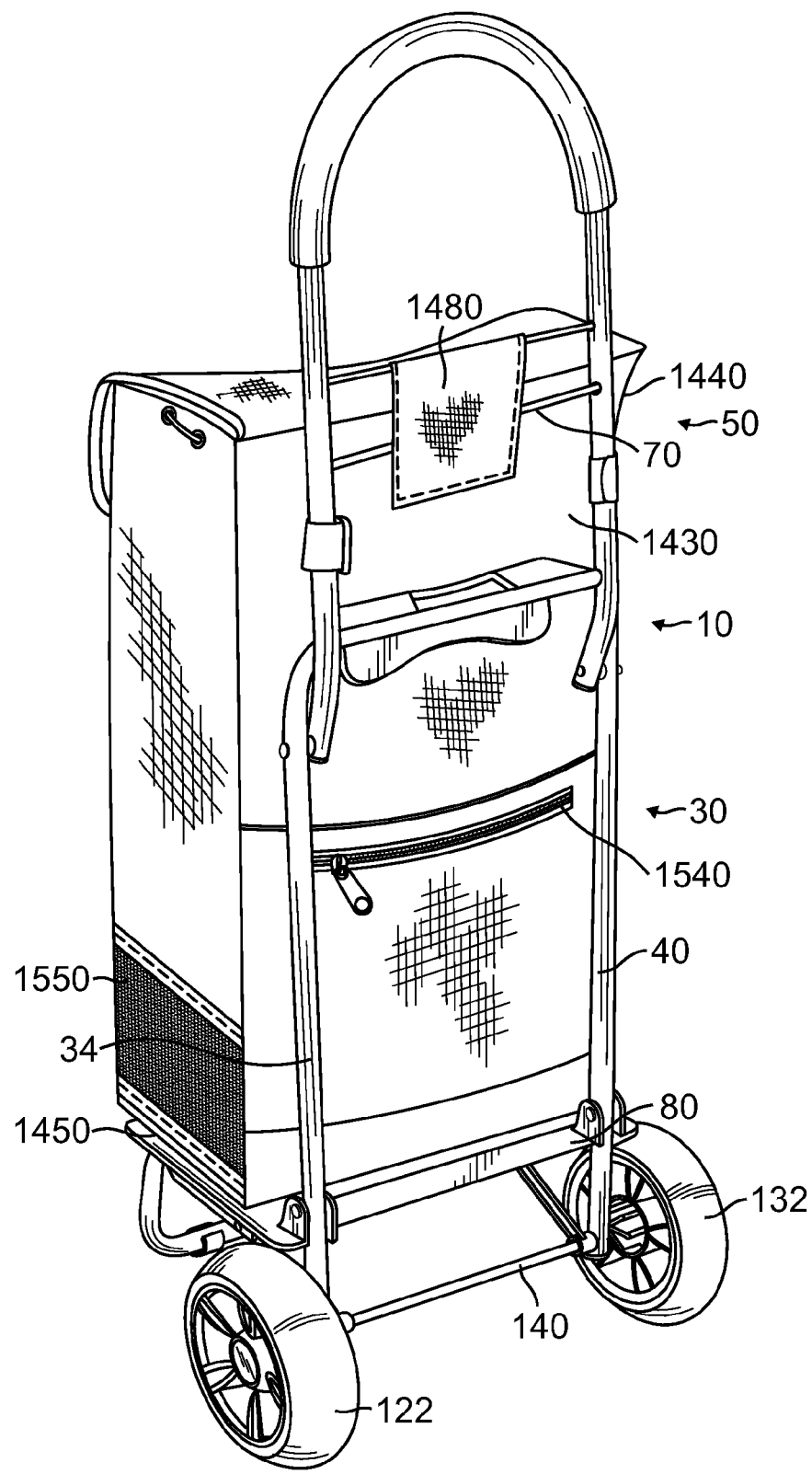
FIG. 11 is a top left side rear perspective view of the present invention cart, illustrating the cart in the fully erect standing condition with the honeycomb toe plate and both of the large rubber bumper wheels (beefy wheels) which are four (4) inches in diameter to enable the cart to be rolled over sand, stairs, curbs, stones and other uneven surfaces, also including an upper crossbar between the top vertical sections of the upper handle section with the bag retained by the upper crossbar and resting on the toe plate.

FIG. 10 is a top right side front perspective view of the present invention cart 10, illustrating the cart in the standing fully erect condition with the honeycomb toe plate 80 and one of the large rubber bumper wheels (beefy wheels) 122 which are four (4) inches in diameter to enable the cart to be rolled over sand, stairs, curbs, cobblestones and any uneven surface, also including an upper crossbar 70 between the lower+vertical leg sections 34 and 40 of the lower handle section 30 with the bag 1400 retained on the upper crossbar 70 and resting on the toe plate 80. FIG. 11 is a top left side rear perspective view of the present invention cart 10, illustrating the cart in the fully erect standing condition with the honeycomb toe plate 80 and both of the large rubber bumper wheels (beefy wheels) 122 and 132 which are four (4) inches in diameter to enable the cart to be rolled over sand, stairs, curbs, stones and other uneven surfaces, also including an upper crossbar 70 between the upper vertical sections of the upper handle section with the bag retained by the upper crossbar 70 and resting on the toe plate 80.

Figure 12:
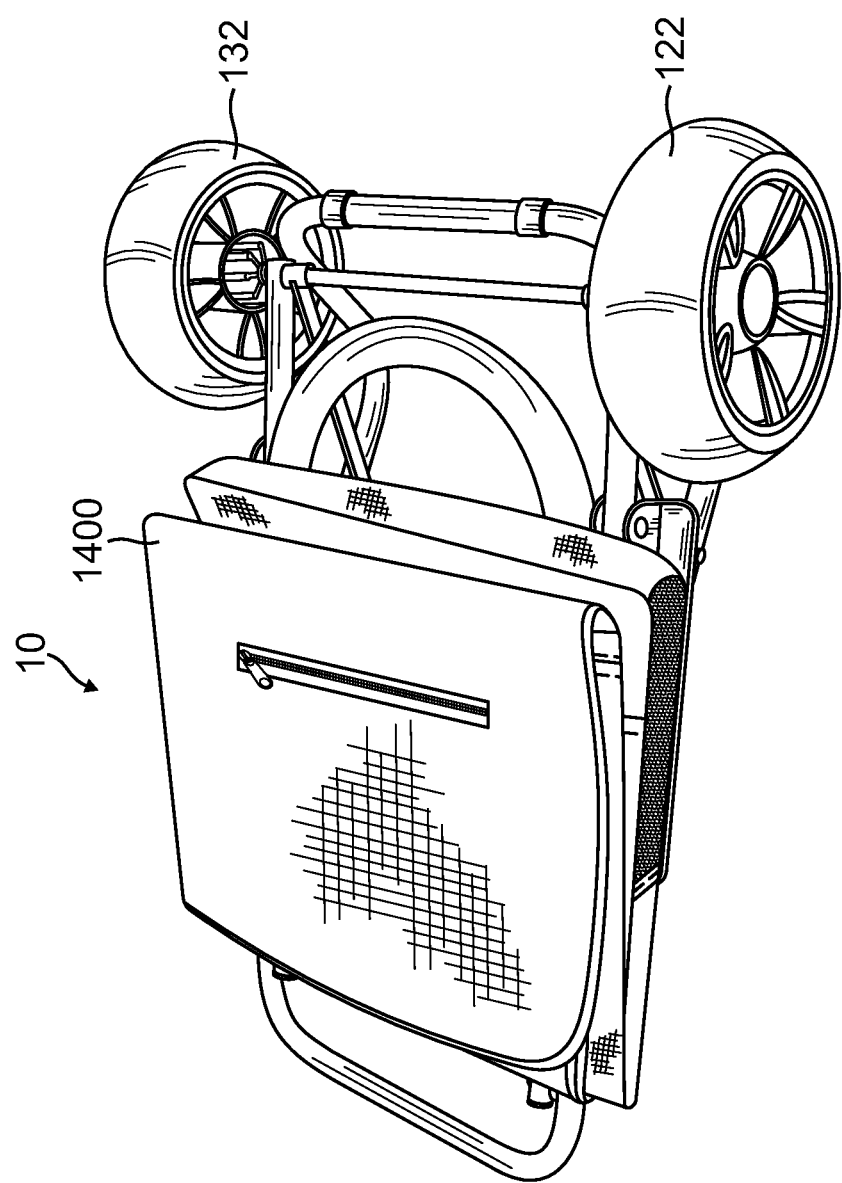
FIG. 12 is a top left side rear perspective view of the present invention cart, illustrating the cart in the fully folded condition with the bag also in the fully folded condition.

FIG. 12 is a top left side rear perspective view of the present invention cart, illustrating the cart in the fully folded condition with the bag also in the fully folded condition.

Referring to FIGS. 11 and 12, the bag 1400 is a flexible bag which is preferably generally rectangular in shape having four walls 1410, 1420, 1430 and 1440 with a bottom wall 1450 and an openable top 1460 which surround and interior chamber 1500 into which objects such as groceries are placed. The bottom wall 1450 rests on toe plate 80. The bag 1400 also has a loop member 1480 which is affixed to rear wall 1430 and which is placed over the crossbar 70 and is affixed over the crossbar 70 by internal fasteners such as internal mating hook and loop fasteners or mating snap fasteners. As a result, the bag 1400 is removably attached to the cart (it is within the spirit and scope of the present invention for the bag to be permanently affixed to the cart) and the bag 1400 can have a multiplicity of pockets as well as a large opening leading to chamber 1500 and closed by top flap 1460 which as closing member 1470 to cover the interior chamber 1500 to enable different types of groceries and products to be securely transported when the cart is rolled. The bag 1400 has any desired multiplicity of pockets such as flap closed pocket 1530 affixed to wall 1410 and a zipper closed pocket 1540 affixed to wall 1430. The bag 1400 can have a portion of any of the walls formed of mesh 1550.

In addition to the unique features as set forth above, another unique feature of the present invention is that the bag 1400 is flexible and is foldable into a flat condition. The cart 10 with the bag 1400 attached can be folded very flat to the length of one-half of its diameter, as illustrated in FIG. 12.

FIG. 12 is a top left side rear perspective view of the present invention cart 10, illustrating the cart 10 in the fully folded condition with the cart 10 and the retained bag 1400 in the folded condition, also illustrating the large rubber bumper wheels (beefy wheels) 122 and 132 which are four (4) inches in diameter to enable the cart to be rolled over sand, stairs, curbs, stones and other uneven surfaces.

Therefore, the key innovations of the present invention are that it is a lightweight cart with an upper section and a lower section which are foldable against each other and an elevated toe plate which is also rotatable and can be folded against the lower section so that the entire assembly can be folded flat to half the width of the entire assembly and can be retained in a locked condition by the locking tab locked on the toe plate. The present invention further includes the large bumper wheels (beefy wheels) which enable it to carry very heavy loads such as up to 160 pounds over various uneven surfaces as previously described, with one half the diameter of the wheels aligned with the toe plate. The invention also discloses a unique folding cart assembly where the upper section can be folded flat against the lower section and then rotated erect so that it can maintain the bag when affixed and also maintain the bag against the toe plate.

The entire design of the cart is engineered to reduce the weight of the heavy boxes and does the work for the user and the honeycomb toe plate is designed for reinforced strength. The cart folds to the width of one-half its overall width for compact storage.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A cart comprising:
   a. a base section formed in a single piece of material including a bottom horizontal section having a left side and a right side, the bottom horizontal section respectively extending on the left side to a left arcuate section which extends to an elevated left horizontal section, and extending on the right side to a right arcuate section which extends to an elevated right horizontal section;
   b. a first lower handle section which is formed in one piece as an elongated U-shaped member having a horizontal section which extends from its left side to a lower vertical left leg member and which extends from its right side to a lower vertical right leg member, the lower vertical left leg member ending at a distal end and the vertical left leg member has two transverse openings extending through it, a first left transverse opening adjacent its horizontal section and a second left transverse opening adjacent its distal end, and the lower vertical right leg member ending at a distal end and the vertical right leg member has two transverse openings extending through it, a first right transverse opening adjacent its horizontal section and a second right transverse opening adjacent its distal end, a protective sheath surrounding a portion of the horizontal section;

c. a second upper handle section which is formed in one piece as an elongated U-shaped member having an upper generally U-shaped member which is covered by a grip covering member which grip covering member has a left distal end and a right distal end, the upper U-shaped member extends to an upper vertical left leg member and to an upper vertical right leg member, a crossbar extends across an interior of the upper handle section and is affixed to upper vertical left leg member and upper vertical right leg member at a location adjacent the right distal end and the left distal end of the grip covering distal ends and extends transverse to the upper vertical left and right leg members, the upper vertical left leg member has a distal end, a section of the upper vertical left leg member adjacent its distal end is bent at an angle relative to the upper vertical left leg member, a transverse opening extends across upper vertical leg section adjacent its distal end, the upper vertical right leg member has a distal end, a section of the upper vertical right leg member adjacent its distal end is bent at an angle relative to upper vertical right leg member, a transverse opening extends across upper vertical leg section adjacent its distal end;

d. a toe plate which has a honeycomb pattern with a multiplicity of openings separated by horizontal solid sections and vertical solid sections, the toe plate rests on and is affixed to the elevated horizontal sections of the base member so that the toe plate is elevated above the horizontal base member, the toe plate rotatably retained to the elevated horizontal sections of the base member;

e. a left bumper wheel with a rubber tire having a diameter of approximately four inches and an oppositely disposed right bumper wheel with a rubber tire having a diameter of approximately four inches, a horizontal mounting bar retaining rotational affixation members to rotatably retain the toe plate, the horizontal mounting bar extending through aligned openings in the lower vertical left leg member and lower vertical right leg member, the horizontal mounting bar further rotatably supporting the left bumper wheel and the right bumper wheel in a manner where one-half the diameter of the left bumper wheel is aligned with the toe plate and one-half the diameter of the right bumper wheel is aligned with the toe plate;

f. the upper handle section is rotatably connected to the lower handle section by a left rotatable affixation member extending through aligned transverse openings in the lower left vertical leg member and the bent section of the upper left vertical leg member and by a right rotatable affixation member extending through aligned transverse openings in the lower right vertical leg member and the bent section of the upper right vertical leg member, in an erect condition, the rotation of the upper handle section relative to the lower handle section is rotated so that the upper handle section is adjacent and above the lower handle section and in a folded condition, the rotation of the upper handle section relative to the lower handle section is in an opposite direction so that the upper handle section is within the lower handle section and the gripping member of the upper handle section rests against an interior wall of the toe plate section;

g. the toe plate rests on the elevated left and right horizontal sections of the base member when the cart is in the erect condition and the toe plate is rotatably connected to the lower handle section and is rotated to lie against the lower handle section when the cart is in the folded condition; and h. a locking tab is rotatably connected to the cross-bar in the upper handle section, the locking tab has a locking member at one end which grips a transverse member of the toe plate so that when the cart is in the folded condition, the locking tab serves to securely lock the cart in a folded condition for safe storage.

2. The cart in accordance with claim 1, further comprising:

a. a flexible generally rectangular bag formed having four vertical walls, a bottom wall and an openable top which collectively surround an interior chamber into which objects are placed;

b. when the cart is in the erect condition, the bottom wall of the flexible generally rectangular bag rests on the toe plate, the flexible generally rectangular bag also having a loop member which is affixed to a rear wall of the bag and which is placed over the crossbar and is affixed over the crossbar by internal fasteners to removably attach the flexible generally rectangular bag to the cart;

c. the flexible generally rectangular bag including a multiplicity of pockets on one or more of the bag walls, at least one pocket being a flap closed pocket and at least one pocket being a zipper closed pocket; and d. the flexible generally rectangular bag is foldable into a flat condition.

3. A cart comprising:

a. a base section formed in a single piece of material including a bottom horizontal section having a left side and a right side, the bottom horizontal section respectively extending on the left side to a left arcuate section which extends to an elevated left horizontal section, and extending on the right side to a right arcuate section which extends to an elevated right horizontal section.

b. a first lower handle section which is formed in one piece having a horizontal section which extends from its left side to a lower vertical left leg member and which extends from its right side to a lower vertical right leg member, the lower vertical left leg member ends at a distal end and a first left transverse opening adjacent the horizontal section and a second left transverse opening adjacent its distal end, and lower vertical right leg member ends at a distal end and has a first right transverse opening adjacent its horizontal section and a second right transverse opening adjacent its distal end, a protective sheath surrounding a portion of the horizontal section;

c. a second upper handle section which is formed in one piece as an elongated U-shaped member having an upper section, the upper section extends to an upper vertical left leg member and to an upper vertical right leg member, the upper vertical left leg member has a distal end, a section of the upper vertical left leg member adjacent its distal end is bent at an angle relative to the upper vertical left leg member, a transverse opening extends across upper vertical leg section adjacent its distal end, the upper vertical right leg member has a distal end, a section of the upper vertical right leg member adjacent its distal end is bent at an angle relative to the upper vertical right leg member, a transverse opening extends across upper vertical right leg member adjacent its distal end;

d. a toe plate which has a honeycomb pattern with a multiplicity of openings separated by horizontal solid sections and vertical solid sections, the toe plate rests on and is affixed to the elevated horizontal sections of the base member so that the toe plate is elevated above the horizontal base member, the toe plate rotatably retained to the elevated horizontal sections of the base member;

e. a left bumper wheel including a rubber tire having a given diameter and an oppositely disposed right bumper wheel including a rubber tire having a diameter identical to the given diameter of the left bumper wheel with a rubber tire, a horizontal mounting bar retaining rotational affixation members to rotatably retain the toe plate, the horizontal mounting bar extending through aligned openings in the lower vertical left leg member and lower vertical right leg member, the horizontal mounting bar further rotatably supporting the left bumper wheel and the right bumper wheel in a manner where one-half of the given diameter of the left bumper wheel is aligned with the toe plate and one-half of the given diameter of the right bumper wheel is aligned with the toe plate;

f. the upper handle section is rotatably connected to the lower handle section by a left rotatable affixation member extending through aligned transverse openings in the lower left vertical leg member and the bent section of the upper left vertical leg member and by a right rotatable affixation member extending through aligned transverse openings in the lower right vertical leg member and the bent section of the upper right vertical leg member, in an erect condition, the upper handle section is rotated relative to the lower handle section so that the upper handle section is adjacent and above the lower handle section; and g. the toe plate rests on the elevated left and right horizontal sections of the base member when the cart is in the erect condition.

4. The cart in accordance with claim 3, further comprising: a cross-bar extends across an interior of the upper handle section and is affixed to the upper vertical left leg member and the upper vertical right leg member.

5. The cart in accordance with claim 4, further comprising:

a. a flexible bag having vertical walls, a bottom wall and an openable top which collectively surround an interior chamber into which objects are placed; and b. when the cart is in the erect condition, the bottom wall of the flexible bag rests on toe plate, the flexible bag also having a loop member which is affixed to a rear wall of the flexible bag and which is placed over the crossbar and is affixed over the crossbar by internal fasteners to removably attach the flexible bag to the cart.

6. The cart in accordance with claim 5, further comprising a. the flexible bag includes a multiplicity of pockets on one or more of the flexible bag walls, at least one pocket being a flap closed pocket and at least one pocket being a zipper closed pocket; and b. the flexible bag is foldable into a flat condition.

7. The cart in accordance with claim 3, further comprising: the second upper handle section having an upper generally U-shaped section which is covered by a grip covering member which grip covering member has a left distal end and a right distal end.

8. The cart in accordance with claim 3, further comprising:

a. the upper handle section is rotated relative to the lower handle section so that the handle section and the gripping member of the upper handle section rest against an interior wall of the toe plate section;

b. the toe plate is rotatably connected to the lower handle section and is rotated to lie against the lower handle section when the cart is in the folded condition; and c. a locking tab is rotatably connected to the cross-bar in the upper handle section, the locking tab has a locking member at one end which grips a transverse member of the toe plate so that when the cart is in the folded condition, the locking tab serves to securely lock the cart in a folded condition for safe storage.

9. The cart in accordance with claim 3, further comprising a pair of stabilizing clips on the horizontal section of the base section.

10. The cart in accordance with claim 3, further comprising:

a. a flexible generally rectangular bag formed having four vertical walls, a bottom wall and an openable top which collectively surround an interior chamber into which objects are placed; and b. when the cart is in the erect condition, the bottom wall rests on toe plate, the bag also having a loop member which is affixed to a rear wall of the bag and which is placed over the crossbar and is affixed over the crossbar by internal fasteners to removably attach the flexible generally rectangular bag to the cart.

11. The cart in accordance with claim 10, further comprising:

a. the flexible rectangular bag including a multiplicity of pockets in one or more of the bag walls, at least one pocket being a flap closed pocket and at least one pocket being a zipper closed pocket; and b. the flexible bag is foldable into a flat condition.

12. A cart comprising:

a. a base section formed in a single piece of material including a bottom lower horizontal section extending to a pair of spaced apart transverse horizontal section elevated above the base section;

b. a first lower handle section which is formed in one piece having a horizontal section which extends from its left side to a lower vertical left leg member and which extends from its right side to a lower vertical right leg member;

c. a second upper handle section which is formed in one piece as an elongated member having an upper section, the upper section extends to an upper vertical left leg member and to an upper vertical right leg member;

d. the upper handle section is rotatably connected to the lower handle section by a left rotatable affixation member extending through aligned transverse openings in the lower left vertical leg member and the upper left vertical leg member and by a right rotatable affixation member extending through aligned transverse openings in the lower right vertical leg member and the upper right vertical leg member in an erect condition, the upper handle section is rotated relative to the lower handle section so that the upper handle section is aligned above the lower handle section;

e. the toe plate rests on the elevated left and right horizontal sections of the base member when the cart is in the erect condition;

f. a left bumper wheel including a rubber tire having a given diameter and an opposite disposed right bumper wheel including a rubber tire having a diameter identical to the given diameter of the left bumper wheel with the rubber tire; and g. a horizontal mounting bar retaining a portion of the lower left leg and the lower right leg and also extending to the left bumper wheel and the right bumper wheel so that one-half of the given diameter of the left bumper wheel is aligned with the toe plate and one-half of the given diameter of the right bumper wheel is aligned with the toe plate;

h. the upper handle section is rotated relative to the lower handle section so that the handle section and the gripping member of the upper handle section rest against an interior wall of the toe plate section;

i. the toe plate is rotatably connected to the lower handle section and is rotated to lie against the lower handle section when the cart is in the folded condition; and j. a locking tab is rotatably connected to the cross-bar in the upper handle section, the locking tab has a locking member at one end which grips a transverse member of the toe plate so that when the cart is in the folded condition, the locking tab serves to securely lock the cart in a folded condition for safe storage.

13. The cart in accordance with claim 12, further comprising: a cross-bar extends across an interior of the upper handle section and is affixed to the upper vertical left leg member and the upper vertical right leg member.

14. The cart in accordance with claim 13, further comprising:

a. a flexible bag having vertical walls, a bottom wall and an openable top which collectively surround an interior chamber into which objects are placed; and b. when the cart is in the erect condition, the bottom wall of the flexible bag rests on toe plate, the flexible bag also having a loop member which is affixed to a rear wall of the flexible bag and which is placed over the crossbar and is affixed over the crossbar by internal fasteners to removably attach the flexible bag to the cart.

15. The cart in accordance with claim 14, further comprising a. the flexible bag includes a multiplicity of pockets on one or more of the flexible bag walls, at least one pocket being a flap closed pocket and at least one pocket being a zipper closed pocket; and b. the flexible bag is foldable into a flat condition.

16. The cart in accordance with claim 12, further comprising: the second upper handle section having an upper generally U-shaped section which is covered by a grip covering member which grip covering member has a left distal end and a right distal end.

17. The cart in accordance with claim 12, further comprising a pair of stabilizing clips on the horizontal section of the base section.

18. The cart in accordance with claim 12, further comprising:

a. a flexible generally rectangular bag formed having four vertical walls, a bottom wall and an openable top which collectively surround an interior chamber into which objects are placed; and b. when the cart is in the erect condition, the bottom wall rests on toe plate, the bag also having a loop member which is affixed to a rear wall of the bag and which is placed over the crossbar and is affixed over the crossbar by internal fasteners to removably attach the flexible generally rectangular bag to the cart.

19. The cart in accordance with claim 18, further comprising:

a. the flexible rectangular bag including a multiplicity of pockets in one or more of the bag walls, at least one pocket being a flap closed pocket and at least one pocket being a zipper closed pocket; and b. the flexible bag is foldable into a flat condition.

* * * * *